(12) United States Patent
Sonnichsen et al.

(10) Patent No.: US 8,263,274 B2
(45) Date of Patent: Sep. 11, 2012

(54) STEAM REFORMER WITH RECUPERATIVE HEAT EXCHANGER

(75) Inventors: Brian Sonnichsen, Portland, OR (US); Bob Sorensen, Hillsboro, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 0 days.

(21) Appl. No.: 13/353,167

(22) Filed: Jan. 18, 2012

(65) Prior Publication Data

US 2012/0141894 A1 Jun. 7, 2012

(51) Int. Cl.
*H01M 8/06* (2006.01)
(52) U.S. Cl. ........................................ 429/425
(58) Field of Classification Search .......... None
See application file for complete search history.

(56) References Cited

U.S. PATENT DOCUMENTS

2005/0217180 A1* 10/2005 Reinke et al. ............... 48/127.9
2010/0279181 A1* 11/2010 Adams et al. ................ 429/410

* cited by examiner

*Primary Examiner* — Patrick Ryan
*Assistant Examiner* — Wyatt McConnell
(74) *Attorney, Agent, or Firm* — Alleman Hall McCoy Russell & Tuttle LLP

(57) ABSTRACT

Embodiments are disclosed that relate to temperature distribution in a reaction chamber of a steam reformer. For example, one disclosed embodiment provides a steam reformer, comprising a central chamber through which feed gas flows, a reaction chamber surrounding the central chamber and having an inner wall and an outer wall, and a recuperative heat exchanger disposed between the inner wall of the reaction chamber and the central chamber.

18 Claims, 7 Drawing Sheets

STEAM REFORMER WITH RECUPERATIVE HEAT EXCHANGER

TECHNICAL FIELD

The present disclosure relates to the field of reforming, and more particularly, to a methane steam reformer for generating hydrogen for use in a fuel cell.

BACKGROUND

In a steam reformer, under high temperatures (e.g., 400-800° C.) and in the presence of a catalyst (e.g., nickel), steam may react with a feed gas (e.g., methane) to generate a reformate (e.g., hydrogen) which may be used as fuel in a hydrogen fuel cell to generate electricity, for example. In some examples, a mixture of hydrogen and carbon monoxide is generated in a main reaction chamber of the steam reformer. The hydrogen and carbon monoxide are mixed with steam and are passed through an auxiliary reaction chamber to further an extent of production of hydrogen in what is known as a water-gas shift (WGS) reaction.

The WGS reaction is highly exothermic and an auxiliary reaction chamber temperature increases as a result. In a circular or annular reaction chamber, the heat produced by the WGS reaction may be dissipated though an outer wall of the auxiliary reaction chamber and through gas exiting the auxiliary reaction chamber. Due to heat loss at the outer wall and uneven flow distribution, local hot zones may exist within the reaction chamber resulting in degradation of the catalyst at the hot zones. In some examples, the auxiliary reaction chamber may be operated at a lower temperature, however, the catalyst is less active and more catalyst is required, thereby increasing a size of the system.

SUMMARY

Accordingly, various embodiments are disclosed herein related to using a heat exchanger to facilitate temperature regulation in a reaction chamber in which a WGS reaction occurs in a steam reformer. For example, one disclosed embodiment provides a steam reformer including a central chamber through which feed gas flows, a reaction chamber surrounding the central chamber and having an inner wall and an outer wall, and a recuperative heat exchanger disposed between the inner wall of the reaction chamber and the central chamber.

In such an example, the recuperative heat exchanger is positioned between the reaction chamber and the central chamber such that heat transfer occurs between the reaction chamber and the heat exchanger. For example, relatively cool feed gas flows through the central chamber and into the heat exchanger. Heat from the exothermic reaction occurring in the reaction chamber is transferred to the feed gas flowing through the heat exchanger, thereby cooling the reaction chamber and decreasing a number and/or volume of local hot zones and providing the reaction chamber with a more even temperature distribution. In this manner, catalyst degradation may be reduced and a size of the reaction chamber may be maintained, for example, while improving the reformer's hydrogen generation efficiency and thus improving the overall fuel cell system's efficient use of fuel.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to various embodiments of a steam reformer which includes a recuperative heat exchanger surrounding a reaction chamber and configured to reduce local hot zones within the reaction chamber. In one example embodiment, a steam reformer includes a central chamber through which feed gas flows, a reaction chamber surrounding the central chamber and having an inner wall and an outer wall, and a recuperative heat exchanger disposed between the inner wall of the reaction chamber and the central chamber. In another example embodiment, the steam reformer further includes an expansion region disposed between an outlet of the recuperative heat exchanger and an inlet of the reaction chamber. When the feed gas passes through the expansion region, for example, the feed gas flow is dispersed such that a uniform distribution of gas is created at the inlet of the reaction chamber. In this way, gas flow through the reaction chamber may be more evenly distributed, thereby reducing non-uniformities in the flow and a possibility of local hot zones developing due to the non-uniformities.

Figure 1:
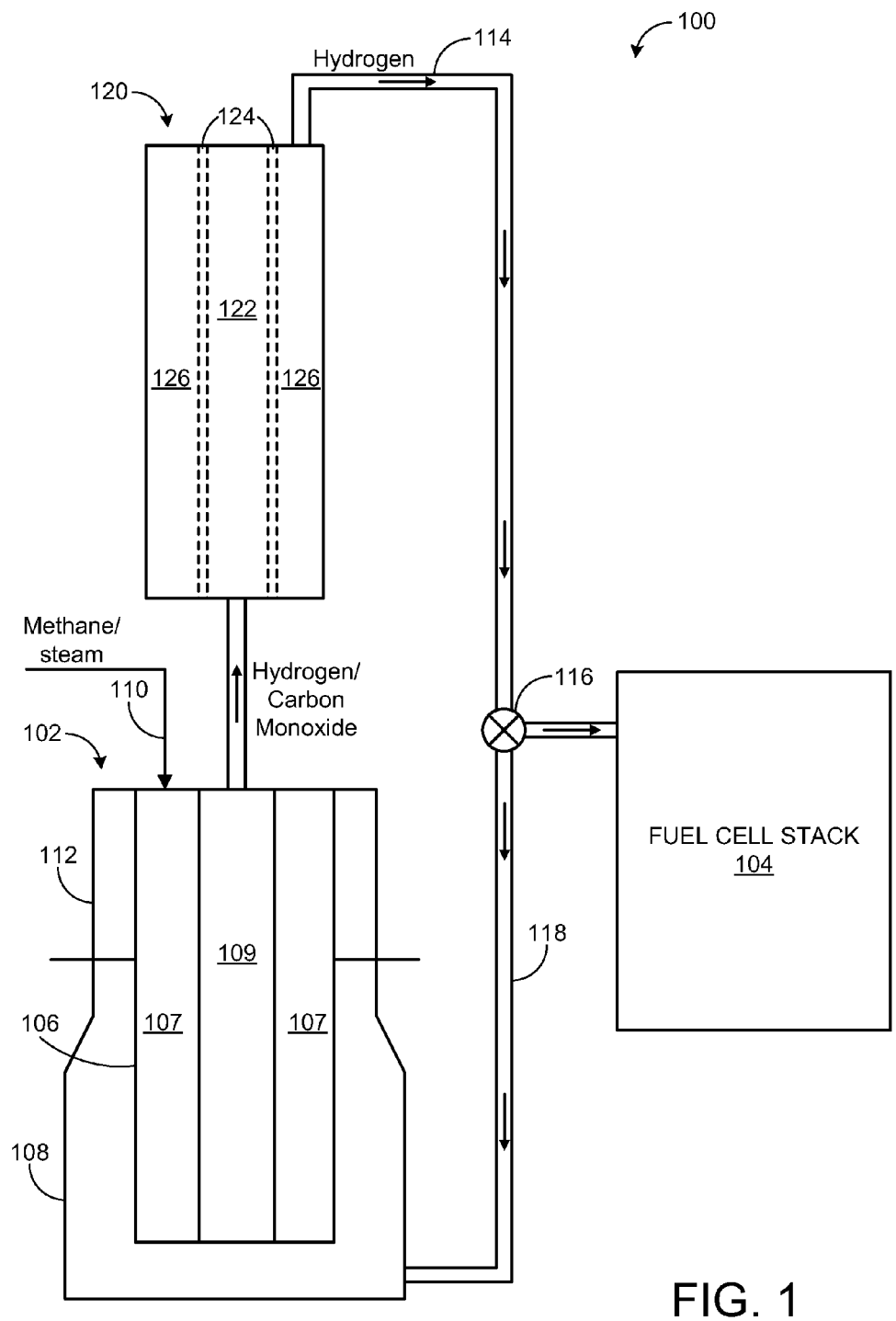
FIG. 1 shows a block diagram of a steam reforming system coupled to a fuel cell stack in accordance with an embodiment of the present disclosure.

FIG. 1 shows an example embodiment of a reformer system 100 including a main reformer 102 and an auxiliary reformer 120 coupled to a fuel cell stack 104. The reformers 102 and 120 may be operable to generate a product stream (e.g., reformate) that contains hydrogen gas, for example. Hydrogen that is generated in the reformer 102 and 120 may be utilized, for example, by a fuel cell stack 104 to generate electrical power. The hydrogen may be further utilized to fuel a diffusion burner positioned within an exterior shell 108 which surrounds an interior reactor 106 of the main reformer 102. The reformers 102 and 120 may be steam reformers, for example, which convert a mixture of steam and a feed gas such as methane to hydrogen and carbon monoxide and/or carbon dioxide. In other embodiments, the reformer 102 may be an autothermal reformer or other reformer.

In the example embodiment of FIG. 1, the interior reactor 106 is supplied with a mixture of feed gas (e.g., methane or other suitable reactant) and water at an inlet 110. The mixture of feed gas and water may be produced in any suitable manner. For the purpose of describing operation of the reactor, the examples described herein will assume the feed gas is methane. It should be understood, however, any suitable feed gas may be used. In some embodiments, the methane/water mixture may be converted to a gaseous mixture by a vaporizer (not shown) before entering the interior reactor 106. In other embodiments, methane and water may be heated so that they are in gaseous form before they are mixed.

In some embodiments, the interior reactor 106 may have a cylindrical shape and a reaction chamber 107 of the interior reactor may have a hollow shape, such as the depicted ring shape, or other suitable shape that surrounds and conforms to the shape of the interior reactor. The reaction chamber 107 may be filled with a packing material such as a catalyst. For example, the packing material may be a metal-based catalyst such as nickel which facilitates the reaction of feed gas and steam within the reaction chamber 107. For example, in the presence of packing material and at high temperature (e.g., 750° C.), methane reacts with steam to form hydrogen and carbon monoxide via the following reversible reaction:

$$CH_4 + H_2O \leftrightarrow CO + 3H_2. \tag{1}$$

The exterior shell 108 may include a burner (not shown), such as a diffusion burner, for heating the reactor to a temperature for the reaction to occur. As shown in FIG. 1, the exterior shell 108 surrounds a portion of the interior reactor extending from a bottom end of the interior reactor 106 partially toward a top end of the interior reactor 106 (e.g., the end where feed gas enters the interior reactor). As a non-limiting example, the exterior shell 108 may cover 60% of the outer wall when the interior reactor rests inside the exterior shell. Exhaust from combustion that occurs within a cavity formed by the exterior shell may be used to heat the feed gas/water mixture before it enters the reaction chamber 107. In some embodiments, the main reformer 102 may further include a recuperator 112 which surrounds a portion of the outer wall of the interior reactor 106 extending from a top portion of the exterior shell 108 toward the top end of the interior reactor 106. The recuperator 112 may be used to heat or maintain a high temperature in the upper part of reaction chamber 107 using exhaust gas from the diffusion burner or exhaust gas from the fuel cell stack 104 to which the interior reactor 106 supplies fuel, for example. It will be understood that heat may be provided to interior reactor 106 in any other suitable manner, and that the above-described embodiment is not intended to be limiting in any manner.

Reformate generated in the reaction chamber 107 of the interior reactor 106 exits the reaction chamber at a bottom portion of the interior reactor and travels through an inner chamber 109 before exiting the interior reactor 106 at its top end. In the example depicted in FIG. 1, the reformate, which may be a gaseous mixture of hydrogen and carbon monoxide is routed to the auxiliary reformer 120 where further hydrogen production may be carried out.

The reformate enters the auxiliary reformer 120 and is mixed with steam, for example. The mixture of reformate and steam forms a feed gas and flows through a central chamber 122 before flowing into a recuperative heat exchanger 124. After flowing through the length of the recuperative heat exchanger 124, the feed gas enters a reaction chamber 126 where a reforming reaction occurs, such as an exothermic water-gas shift reaction. For example, similar to the reaction chamber 107, the reaction chamber 126 may be filled with a catalyst which facilitates the reaction. As will be described in greater detail below with reference to FIGS. 2-7, the recuperative heat exchanger 124 may enable a heat exchange between the feed gas and the reaction chamber 126 which increases uniformity of a temperature distribution within the reaction chamber 126.

As shown in the example of FIG. 1, hydrogen is routed from the reformer 120 to the fuel cell stack 104 via a first pipe 114. The first pipe 114 may have a diameter in accordance with, for example, a desired amount and/or pressure of hydrogen to be supplied to the fuel cell stack 104 based on a flow rate and pressure of hydrogen generated in the interior reactor 106. The first pipe 114 may be made of any suitable material for transporting hydrogen, such as stainless steel, for example. It will be understood that the term "pipe" signifies any suitable structure for carrying gases such as a tube, a hose, a manifold, or the like.

The fuel cell stack 104 may be configured to generate power from a reaction between the supplied fuel (e.g., hydrogen) and an oxidant for driving an external load. In some embodiments, the fuel cell stack 104 may include a plurality of fuel cells that may be electrically connected to generate a higher voltage. For example, the fuel cell stack 104 may include a plurality of fuel cells electrically connected in series.

The system 100 further includes a valve 116 for regulating a supply of a fuel to the fuel cell stack 104. The valve 116 may be controlled via a controller (not shown) to route a first portion of the hydrogen generated in the interior reactor 106 to the fuel cell stack 104. The valve 116 may be further controlled to route a second portion of hydrogen to the diffusion burner (not shown) positioned within the bottom portion of the exterior shell 108 via a second pipe 118. As one example, the valve 116 may be a three-way valve. The second pipe 118 may have similar characteristics (e.g., diameter, material, etc.) as the first pipe 114, for example. It will be understood that the depicted fuel delivery system (e.g., the first and second pipes 114 and 118 and the valve 116) is shown for the purpose of example, and that any other suitable component or components may be utilized to supply hydrogen to the diffusion burner and the fuel cell stack 104. In other embodiments, the system 100 may not include valve 116. Instead, hydrogen generated in the interior reactor may be routed to the fuel cell stack, and unused hydrogen may be routed to the diffusion burner, for example.

The system 100 may form a main or auxiliary electrical power supply, such as a heating system for a business or residential building. As such, packaging constraints may exist for the system and the system may have limited packaging space. A size of a system which includes the auxiliary reaction chamber with a recuperative heat exchanger, which will be described in greater detail below with reference to FIGS. 2-7, may be reduced such that efficiency of the system is maintained while also meeting packaging space constraints.

Figure 2:
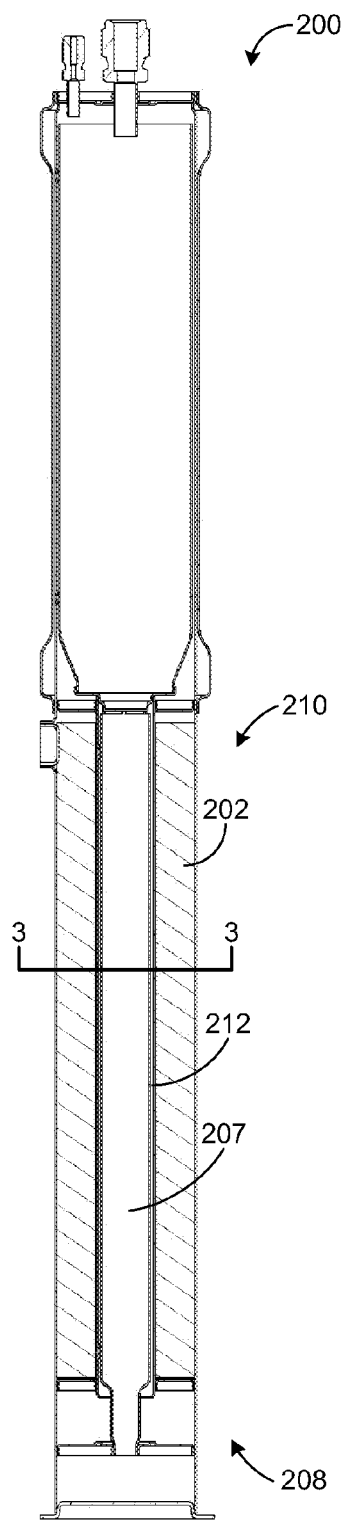
FIG. 2 shows a cross-sectional view taken along a longitudinal direction of an example embodiment of a reaction chamber that may be used in a steam reformer.
Figure 3:
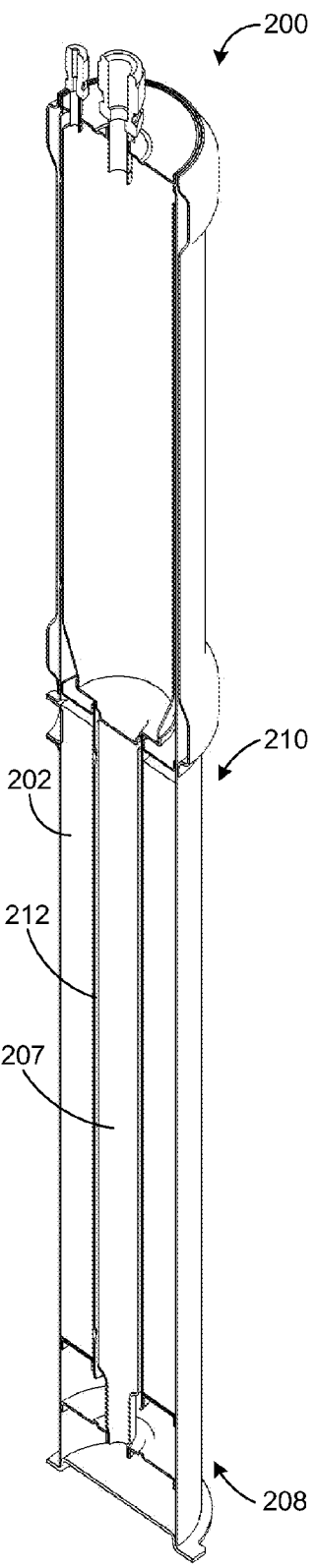
FIG. 3 shows a perspective view of the cross-section of the reaction chamber shown in FIG. 2.
Figure 4:
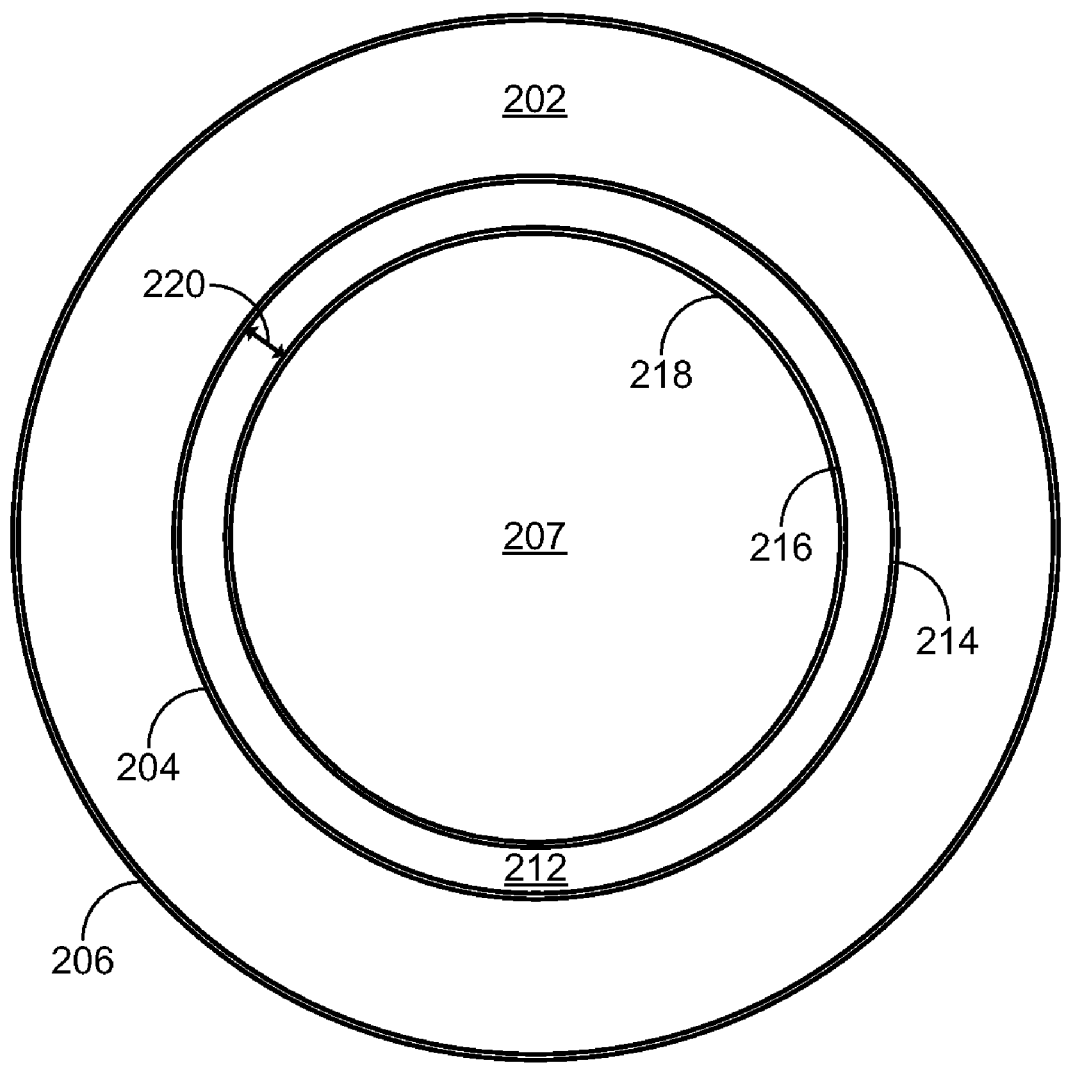
FIG. 4 shows a cross-sectional view taken along a radial direction of the reaction chamber shown in FIG. 2.

Continuing to FIGS. 2-4, detailed examples of an embodiment of a reformer 200 in which a steam reforming reaction may occur, such as the auxiliary reformer 120 of FIG. 1, are shown. In particular, FIG. 2 shows a cross-sectional view taken along a radial direction of the reformer 200. FIG. 3 shows a perspective view of the cross-section of the reformer 200 shown in FIG. 2, and FIG. 4 shows a cross-sectional view taken along a radial direction (e.g., perpendicular to the longitudinal direction) of the reformer shown in FIG. 2. FIGS. 2 and 3 are drawn to scale.

As depicted in the examples of FIGS. 2-4, the reaction chamber 202 has an inner wall 204 and an outer wall 206. Both the inner wall 204 and the outer wall 206 have substantially cylindrical shapes. As such, the reaction chamber 202 has a substantially annular, or ring, shape. As described above, the reaction chamber 202 may be filled with a packing material such as a catalyst such that a catalyst bed is formed within the reaction chamber. The packing material may be a metal-based catalyst such as platinum or nickel which facilitates the reaction of feed gas and steam within the reaction chamber 202, for example.

The reformer 200 further includes an inner chamber 207. Feed gas flows into the inner chamber 207 from a bottom portion 208 of the reformer 200 and flows toward a top portion 210 of the reformer 200 such that the feed gas flows in a first direction, as will be described in greater detail below with reference to FIGS. 5-7. In other examples, the feed gas may enter the inner chamber from the top portion 210 of the reformer 200 and flow to the bottom portion 208 of the reformer. The inner chamber 207 may be an empty, or hollow, cylindrical chamber through which the relatively cool feed gas flows, for example.

The reformer 200 further includes a recuperative heat exchanger 212. As shown, the heat exchanger 212 and the reaction chamber 202 are adjacent. As such, the inner wall 204 of the reaction chamber 202 and an outer wall 214 of the heat exchanger 212 form a shared wall. Further, the heat exchanger 212 and the central chamber 207 are adjacent such that an inner wall 216 of the heat exchanger 212 and a wall 218 of the central chamber 206 form a shared wall. Because the heat exchanger 212 is disposed between the wall 218 of the central chamber 206 and the inner wall 204 of the reaction chamber 202, the heat exchanger 212 has an annular, or ring, shape that has a substantially constant thickness 220 (e.g., distance between the outer wall and the inner wall of the heat exchanger) along a length of the heat exchanger 212. In one example, the heat exchanger 212 has a thickness of 1.5 mm. In other examples, the heat exchanger 212 may have a thickness that is greater than or less than 1.5 mm. In general, the thickness of the recuperative heat exchanger 212 is less than that of the reaction chamber 202. The thickness 220 of the recuperative heat exchanger 212 may be based on a desired heat transfer rate, for example. In a configuration such as shown in FIGS. 2-4, the central chamber 206, the heat exchanger 212, and the reaction chamber 202 are concentric about a longitudinal axis of the reformer 200.

As will be described in greater detail below with reference to FIGS. 5-7, the feed gas enters an inlet of the recuperative heat exchanger 212 which is located at the top portion 210 of the reformer 200 and flows downward in a second direction toward the bottom portion 208 of the reformer 200. At the bottom portion 208 of the reformer 200, the feed gas flows from an outlet of heat exchanger 212 to an inlet of the reaction chamber 202 where a reaction, such as a water-gas shift reaction, occurs as the feed gas flows upward in the first direction through the reaction chamber 202. In this manner, the feed gas follows a continuous flow path through the reformer 200 which starts at the inlet of the inner chamber 207 at the bottom portion 208 of the reformer 200 and ends at an outlet of the reaction chamber 202 at the top portion 210 of the reformer 200.

As the feed gas flows upward through the reaction chamber 202 and the reaction is carried out, the energy released may increase a temperature of the catalyst in an upper portion of the reaction chamber more than in a lower portion of the reaction chamber. Thus, as the relatively cooler feed gas flows through an upper portion of the heat exchanger 212, heat from the exothermic reaction occurring in the reaction chamber 202 is transferred from the reaction chamber 202 to the feed gas flowing through the heat exchanger 212. As the warmed feed gas flows through a lower portion of the heat exchanger 212, heat may be transferred from the warmed feed gas to the cooler, lower portion of the reaction chamber 202. In this manner, a more uniform temperature distribution may be created in the reaction chamber 202, thereby decreasing degradation of the catalyst due to local hot zones. Further, because of the more uniform temperature distribution and reduced number of hot zones, a size of the reaction chamber may be reduced resulting in a more compact reformer.

Figure 5:
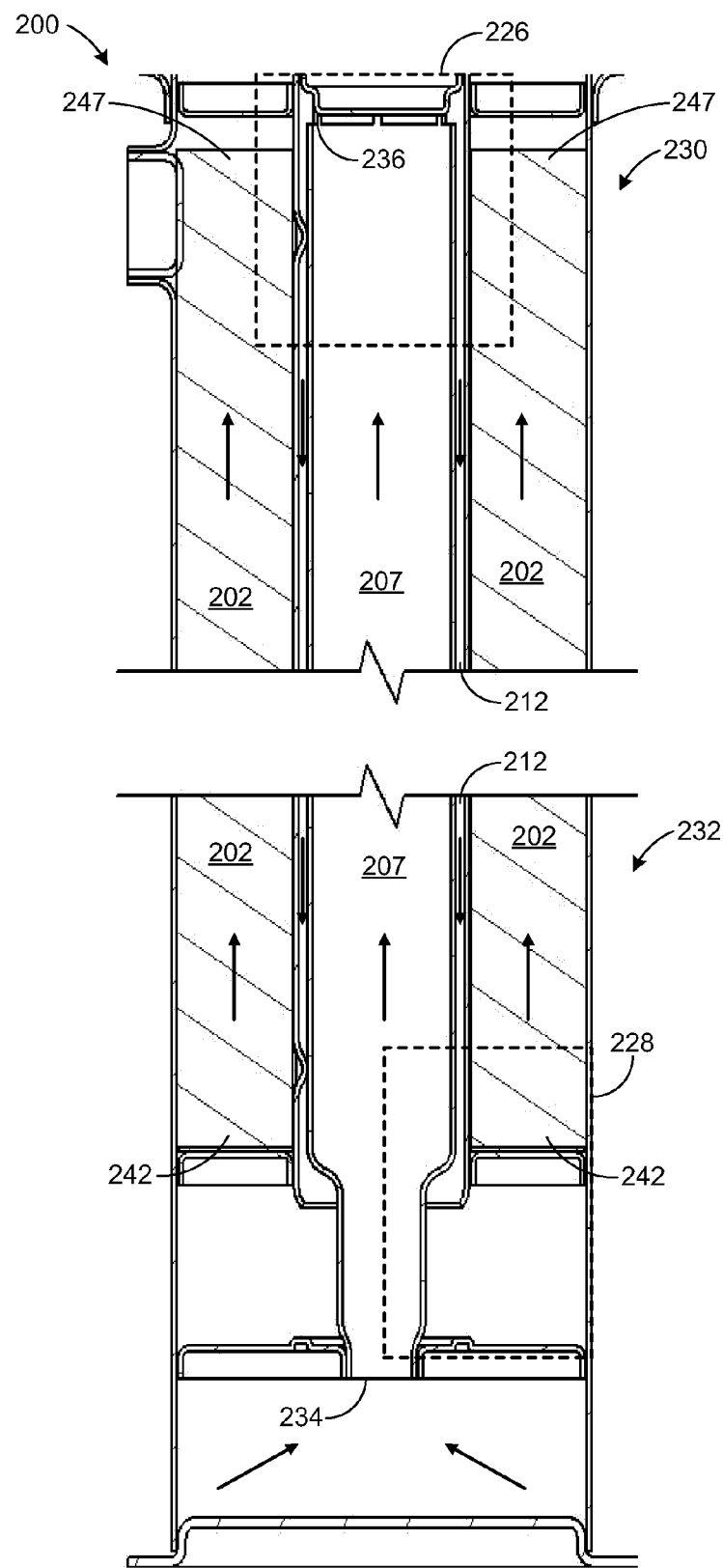
FIG. 5 shows a cross-sectional view of taken along a longitudinal direction of top and bottom portions of a reaction chamber.
Figure 6:
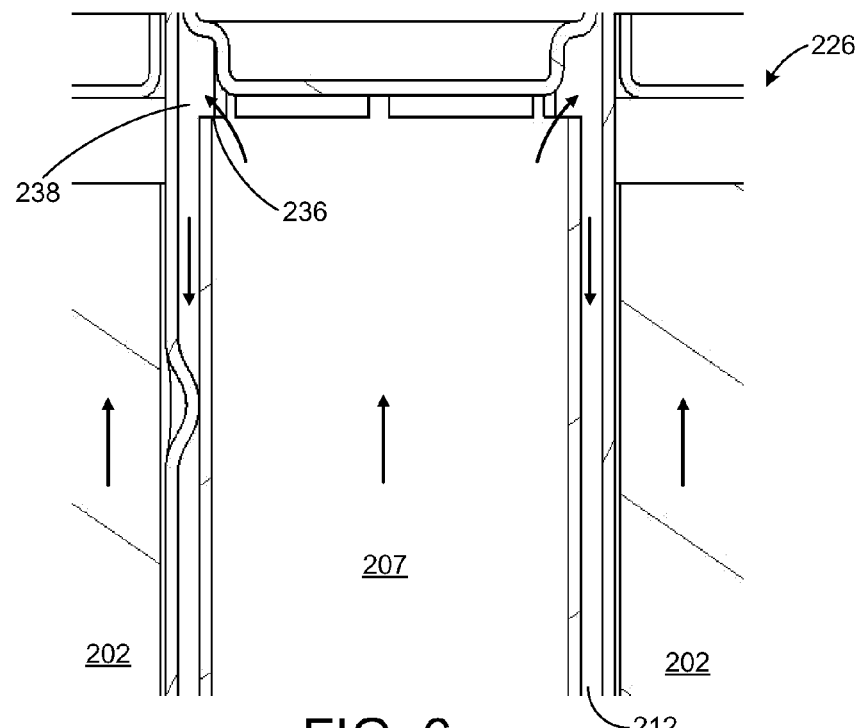
FIG. 6 shows a cross-sectional view of the top portion of the reaction chamber shown in FIG. 5.
Figure 7:
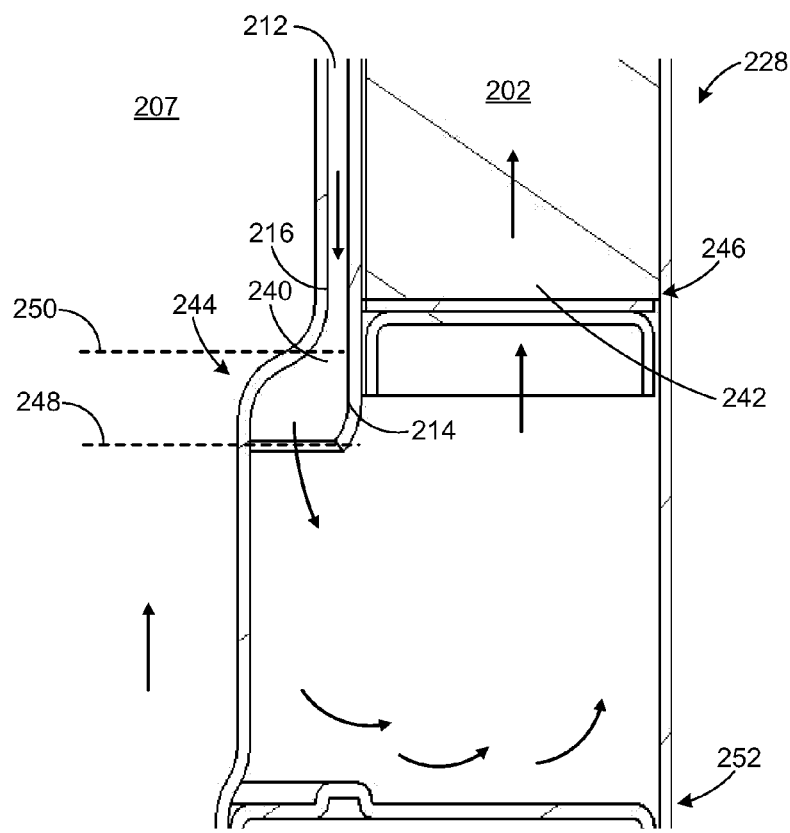
FIG. 7 shows a cross-section view of the bottom portion of the reaction chamber shown in FIG. 5.

Continuing to FIGS. 5-7, more detailed cross-sectional views of feed gas flow through the reformer 200 are shown. In particular, FIG. 5 shows upper and lower portions 230 and 232 of the reformer 200. FIG. 6 shows an enlarged view of section 226 of FIG. 5 and FIG. 7 shows an enlarged view of section 228 of FIG. 5. FIGS. 5-7 are drawn to scale.

As depicted, feed gas (indicated by arrows in FIGS. 5-7) enters an inlet 234 of the inner chamber 207 in the lower portion 232 of the reformer (e.g., the bottom portion 208 of the reformer 200 shown in FIG. 2). The feed gas may be a mixture of hydrogen and carbon monoxide, for example, that is directed from a reaction chamber of a main reformer to the auxiliary reformer 200 to further the extent of hydrogen production from the original feed gas. In other examples, the feed gas may have another suitable composition. As shown, the feed gas enters the inlet 234 of the inner chamber 207 and flows in a first direction, which is upward along the longitudinal direction (e.g., parallel to the longitudinal axis) of the reformer in the examples of FIGS. 5-7. In other embodiments, the feed gas may enter the upper portion 230 of the reformer 200, and the inlet of the inner chamber may be positioned at the top of the reformer 200 such that the feed gas flows downward through the inner chamber.

The feed gas flows up through the inner chamber 207 to a top of the inner chamber where an outlet 236 is disposed around a perimeter of the inner chamber 207. FIG. 6 shows an enlarged view of section 226 of FIG. 5. As shown in FIG. 6, the feed gas exits the inner chamber 207 through the outlet 236 of the inner chamber and enters the recuperative heat exchanger 212 via the inlet 238 of the recuperative heat exchanger 212. As the feed gas exits the inner chamber 207 and enters the heat exchanger 212, the direction of flow is changed such that the feed gas flows through the heat exchanger 212 parallel to the longitudinal direction of the reformer 200 in a second direction and a speed of the feed gas flow may be increased. In the examples described herein, the second direction is the opposite of the first direction, for example, and as such, the feed gas flows from a top of the heat exchanger 212 to a bottom of the heat exchanger 212. In other examples, the feed gas may flow from the bottom of the heat exchanger to the top of the heat exchanger, depending on the locations of the outlet of the inner chamber and the inlet of the heat exchanger, for example.

The feed gas flows downward through the recuperative heat exchanger 212 toward an outlet 240 of the heat exchanger 212 near the bottom portion 208 of the reformer 200. As the feed gas exits the heat exchanger 212 and before entering an inlet 242 of the reaction chamber 202, the feed gas passes through an expansion region 244 and is turned. The feed gas expands as it passes through the expansion region 244, for example.

As shown, the thickness of the heat exchanger 212 increases at the expansion region 244. In this manner, a speed of the feed gas flow may decrease. For example, the outer wall 214 of the heat exchanger extends past a bottom 246 of the reaction chamber 202 and curves inward toward a center of the reformer 200 and the inner wall 216 of the heat exchanger with a first radius of curvature. The outer wall 214 of the heat exchanger stops at a first position 248. The first radius of curvature may be such that the end of outer wall 214 is aligned with a center of the heat exchanger, as shown in FIG. 7. The inner wall 216 of the heat exchanger curves inward toward the center of the reformer 200 with a second radius of curvature, which is greater than the first radius of curvature. At a second position 250, which is at a higher point along the longitudinal direction in the steam reformer than the first position 248, the inner wall 216 curves downward until it is parallel with the longitudinal axis of the steam reformer 200 and then extends to a bottom 252 of the steam reformer 200.

In such a configuration, the feed gas expands and slows down as it exits the recuperative heat exchanger 212 due to the increasing thickness of the heat exchanger 212 in the expansion region 244. Further, as the expansion region 244 extends downward, the flow of feed gas is turned. Associated pressures encourage the feed gas to distribute around a circumference and width of the expansion region 244. As such, the expansion region 244 acts a flow distributor, for example. By the time the feed gas is turned upward in the first direction and flows into the inlet 242 of the reaction chamber 202, the feed gas may have spread to a uniform distribution across the surface of the inlet 242. In this manner, a more uniform distribution of feed gas enters the reaction chamber 202, thereby reducing hot zones in the catalyst caused by non-uniform flow through the reaction chamber 202.

Thus, the expansion region 244 turns the feed gas to flow in the first direction through the reaction chamber 202, parallel to the longitudinal direction of the reformer 200, toward a reformate outlet 247 at a top of the reaction chamber 202. As such, the flow of feed gas through the reaction chamber 202 is a counter-flow to the flow of feed gas through the recuperative heat exchanger 212, and heat exchange occurs between the flow of feed gas in the heat exchanger 212 and the flow of feed gas and reformate in the reaction chamber 202. As described above, a temperature of the catalyst in the reaction chamber 202 may increase in the upper portion of the reaction chamber 202 due to the exothermic reaction occurring in and upward flow of feed gas and reformate through the reaction chamber 202. Because the feed gas entering the recuperative heat exchanger 212 is relatively cool, the feed gas flowing through the heat exchanger 212 may absorb heat from the reaction chamber in the upper portion of the heat exchanger 212. As such, a temperature of the feed gas may increase as it flows downward. Because the catalyst in the lower portion of the reaction chamber 202 may be relatively cool, the lower portion of the reaction chamber 202 may absorb heat from the warmed feed gas flowing through the lower portion of the heat exchanger 212. In this manner, the reaction chamber may have a more uniform temperature distribution resulting in a reduction in local hot zones and a decrease in catalyst degradation, for example.

Thus, the auxiliary reformer may include the recuperative heat exchanger and the expansion region at the outlet of the recuperative heat exchanger. The recuperative heat exchanger facilitates heat exchange such that a more uniform temperature distribution exists in the reaction chamber. The expansion region provides a more uniformly distributed flow of feed gas entering the reaction chamber. Due to the more uniform distribution of feed gas entering the reaction chamber and the more uniform temperature distribution within the reaction, a number and/or volume of local hot zones within the reaction chamber may be reduced. In this way, degradation of the catalyst may be decreased and a size of the reaction chamber, and thus the auxiliary reformer, may be reduced while maintaining the efficiency of the reformer. Further, because the reformer may be made more compact, increased packaging constraints (e.g., a smaller space available for the reformer) may be met.

Figure 8:
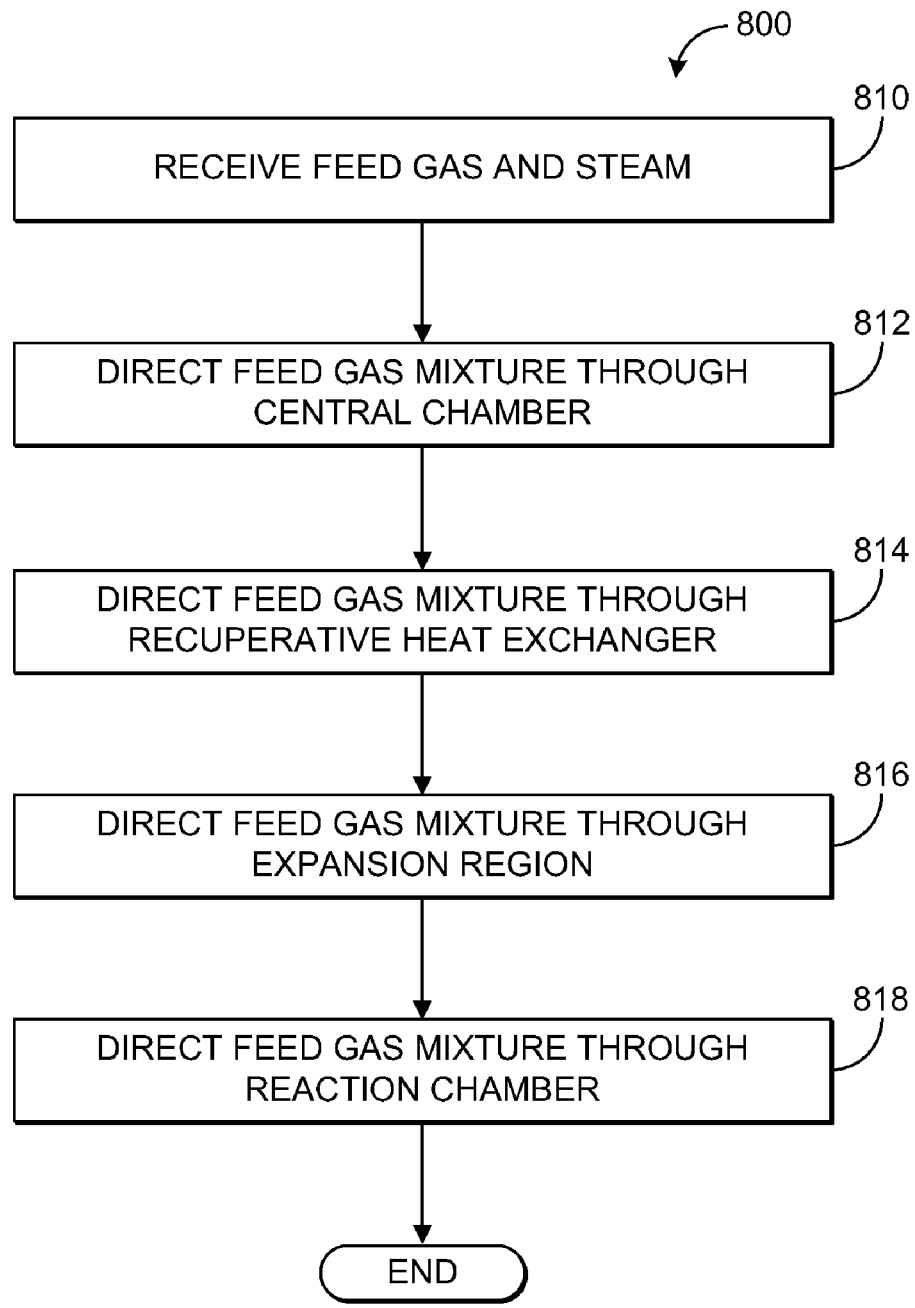
FIG. 8 shows a flow chart illustrating a method for a steam reformer in accordance with an embodiment of the present disclosure.
Figure 9:
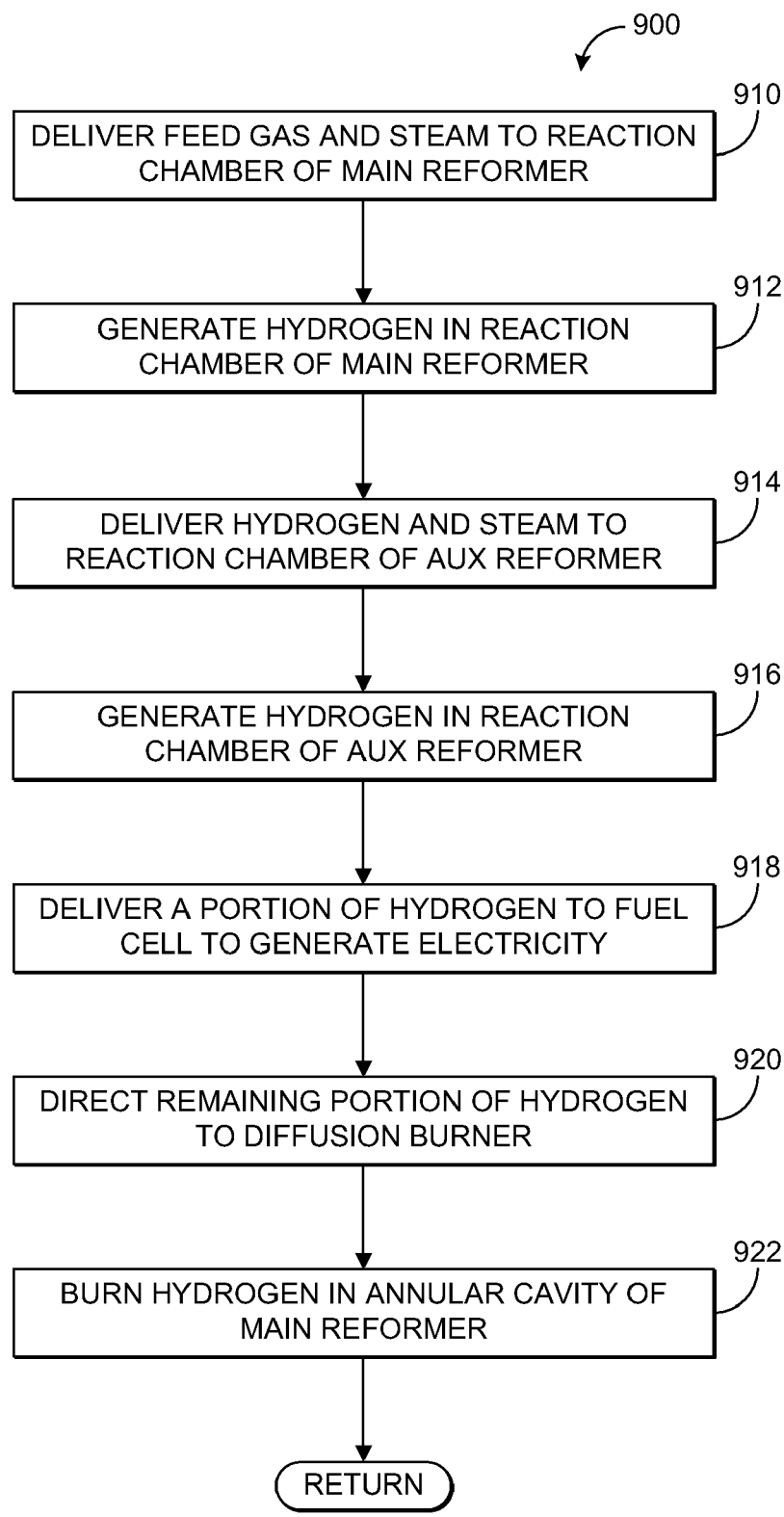
FIG. 9 shows a flow chart illustrating a method for a main steam reformer and an auxiliary steam reformer coupled to a fuel cell stack in accordance with an embodiment of the present disclosure.

FIGS. 8 and 9 show flow charts for a reformer system which includes a main reformer and an auxiliary reformer, such as the reformer system 100 described above with reference to FIG. 1. In particular, FIG. 8 shows a method for directing a feed gas flow through an auxiliary reformer with a recuperative heat exchanger. FIG. 9 shows a method for generating hydrogen in a system which includes a main reformer and the auxiliary reformer and for delivering the hydrogen to a fuel cell stack.

The flow chart in FIG. 8 illustrates an embodiment of a method 800 for an auxiliary steam reformer, such as the auxiliary steam reformer 200 described above with reference to FIGS. 2-7.

At 810 of method 800, the reformer receives feed gas and steam. For example, the feed gas may be a mixture of hydrogen and carbon monoxide generated in a main reformer. The mixture of feed gas and steam are directed through a central chamber of the reformer in a first direction at 812 of method 800.

Once the feed gas mixture reaches a distal end of the central chamber, the feed gas mixture is turned and directed to flow in a second direction through a recuperative heat exchanger at 814 of method 800. As described above, the second direction may be parallel but opposite to the first direction. In this manner, the feed gas mixture flows along the length of the heat exchanger before it is directed to the reaction chamber.

At an outlet of the recuperative heat exchanger, the feed gas mixture is directed to flow through an expansion region at 816 of method 800. As the feed gas flows through the expansion region, it expands and turns such that a more evenly distributed flow of the feed gas mixture is directed to flow into a reaction chamber of the auxiliary reformer at 818 of method 800. The feed gas mixture flows through the reaction chamber in the first direction such that it is a counter-flow to the flow of feed gas mixture through the recuperative heat exchanger. As such, heat exchange occurs between the feed gas mixture flowing through the heat exchanger and the catalyst in the reaction chamber, thereby creating a more uniform temperature distribution in the reaction chamber, as described above.

The flow chart in FIG. 9 illustrates an embodiment of a method 900 for a steam reformer system coupled to a fuel cell stack, such as the main and auxiliary steam reformers 102 and 120 and the fuel cell stack 104 shown in FIG. 1.

At 910 of method 900, feed gas and steam are delivered to the reaction chamber of the main reformer. As described above, the feed gas may be methane or another suitable reactant. Hydrogen is then generated at 912 of method 900 as the feed gas travels through the reaction chamber and is converted to hydrogen in the presence of a catalyst and high temperatures.

At 914 of method 900, hydrogen and carbon monoxide generated in the main reformer and steam are delivered to the reaction chamber of the auxiliary reformer, as described above with reference to FIG. 8. Hydrogen is then generated at 916 of method 900 as the gaseous mixture travels through the reaction chamber and more hydrogen is generated in the presence of a catalyst.

Once hydrogen is generated, a first portion of the hydrogen is delivered to the fuel cell stack to generate electricity at 918. For example, a first pipe routes the hydrogen to the fuel cell stack and the amount of hydrogen routed to the fuel cell stack is controlled via adjustment of a valve. A second portion of hydrogen is routed to an inlet of the diffusion burner at 920 of method 900. For example, the valve may be controlled to route the second portion of hydrogen to the diffusion burner via a second valve.

Hydrogen that is routed to the diffusion burner is then burned in the cavity formed by the exterior shell at 922 of method 900 such that the reforming reaction may be carried out in the main reformer.

Thus, the methods described herein provide for a method comprising receiving feed gas and directing the feed gas along a central chamber in a first direction; at an outlet of the central chamber, directing the feed gas to flow in a second direction through a recuperative heat exchanger surrounding an exterior of the central chamber; at an outlet of the recuperative heat exchanger, directing the feed gas through an expansion region; and directing the feed gas to flow from the expansion region to an inlet of a reaction chamber surrounding an exterior of the recuperative heat exchanger and through the reaction chamber in the first direction. The method includes expanding a flow of the feed gas and turning the flow of feed gas in the expansion region. The method also includes generating hydrogen in the reaction chamber. The method includes routing the hydrogen generated in the reaction chamber to a fuel cell stack.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A steam reformer, comprising:
a central chamber through which feed gas flows;
a water-gas shift reaction chamber, configured to generate a reformate via a water-gas shift reaction, surrounding the central chamber and having a first inner wall and a first outer wall; and
a recuperative heat exchanger extending from above a top portion of the reaction chamber past a bottom portion of the reaction chamber and disposed interior to the reaction chamber and having a second outer wall, the first inner wall and second outer wall forming a shared wall.

2. The steam reformer of claim 1, wherein the central chamber, the heat exchanger, and the reaction chamber are concentric about a longitudinal axis of the steam reformer.

3. The steam reformer of claim 1, wherein the heat exchanger and the reaction chamber are adjacent.

4. The steam reformer of claim 1, wherein the heat exchanger and the central chamber are adjacent, and a second inner wall of the heat exchanger and a wall of the central chamber form a shared wall.

5. The steam reformer of claim 1, further comprising a feed gas inlet at a bottom of the central chamber and a feed gas outlet at a top of the central chamber, the central chamber having a first flow direction.

6. The steam reformer of claim 1, further comprising a feed gas inlet at a top of the heat exchanger and a feed gas outlet at a bottom of the heat exchanger, the heat exchanger having a second flow direction.

7. The steam reformer of claim 1, further comprising a feed gas inlet at a bottom of the reaction chamber and a reformate outlet at a top of the reaction chamber, the reaction chamber having a first flow direction.

8. The steam reformer of claim 1, further comprising an expansion region disposed at an outlet of the heat exchanger.

9. The steam reformer of claim 8, wherein, at the expansion region, the second outer wall of the heat exchanger curves inward toward a second inner wall of the heat exchanger with a first radius of curvature and stops at a first position.

10. The steam reformer of claim 9, wherein, at the expansion region, the second inner wall of the heat exchanger curves inward with a second radius of curvature which is greater than the first radius of curvature to a second position and then curves downward and extends parallel to a longitudinal axis of the steam reformer to a bottom of the steam reformer.

11. The steam reformer of claim 1, wherein the heat exchanger has a width of 1.5 mm.

12. A steam reformer, comprising:
a central chamber through which feed gas flows;
a water-gas shift reaction chamber comprising a catalyst, configured to generate a reformate via a water-gas shift reaction, surrounding the central chamber and having an inner wall and an outer wall;
a recuperative heat exchanger extending from above a top portion of the reaction chamber past a bottom portion of the reaction chamber and disposed between the inner wall of the reaction chamber and the central chamber; and
an expansion region disposed at an outlet of the recuperative heat exchanger and configured to create a uniform distribution of gas at an inlet of the reaction chamber.

13. The steam reformer of claim 12, wherein the central chamber and the heat exchanger are adjacent and the reaction chamber and the heat exchanger are adjacent, and wherein the central chamber, the heat exchanger, and the reaction chamber are concentric about a longitudinal axis of the steam reformer.

14. The steam reformer of claim 12, wherein a thickness of the heat exchanger increases at the expansion region.

15. The steam reformer of claim 12, wherein the feed gas flows through the central chamber in a first direction, through the heat exchanger in a second direction which is opposite to the first direction, and through the reaction chamber in the first direction, and wherein the central chamber, the heat exchanger, and the reaction chamber form a continuous flow path.

16. The steam reformer of claim 12, wherein a reformate is generated in the reaction chamber, and the reformate is routed to a fuel cell stack coupled to the steam reformer via a first pipe.

17. The steam reformer of claim 16, wherein the fuel cell stack is coupled to a building heating system.

18. A system, comprising:
a fuel cell stack;
a main reformer operable to generate a feed gas; and
an auxiliary reformer operable to generate a reformate fuel for the fuel cell stack, comprising:

a cylindrical central chamber through which the feed gas from the main reformer flows;

an annular reaction chamber, configured to generate a reformate via a water-gas shift reaction, surrounding the central chamber and having an inner wall and an outer wall;

an annular recuperative heat exchanger extending from above a top portion of the reaction chamber past a bottom portion of the reaction chamber and disposed between the inner wall of the reaction chamber and the central chamber, the heat exchanger having a smaller thickness than the reaction chamber; and an expansion region disposed at an outlet of the heat exchanger at a bottom portion of the auxiliary reformer and configured to create a uniform distribution of gas at an inlet of the reaction chamber, and wherein a thickness of the heat exchanger increases in the expansion region.

* * * * *